(12) United States Patent
Fisher et al.

(10) Patent No.: US 6,707,220 B1
(45) Date of Patent: Mar. 16, 2004

(54) ELECTRIC MOTOR BRUSH HOLDER FOR SUPPRESSING AUDIBLE AND ELECTROMAGNETIC NOISE

(75) Inventors: Bryan Todd Fisher, Appin (CA); Stan Simpson, St. Thomas (CA); Eric Bartlett, London (CA)

(73) Assignee: Siemens VDO Automotive, Inc., Mississauga (CA)

( * ) Notice: Subject to any disclaimer, the term of this patent is extended or adjusted under 35 U.S.C. 154(b) by 2 days.

(21) Appl. No.: 10/406,408

(22) Filed: Apr. 3, 2003

Related U.S. Application Data
(60) Provisional application No. 60/446,761, filed on Feb. 12, 2003.

(51) Int. Cl.[7] .............................................. H02K 13/00
(52) U.S. Cl. ..................... 310/239; 310/238; 310/244; 310/242; 310/248; 310/246
(58) Field of Search ................... 310/239, 244, 310/242, 238, 246, 248

(56) References Cited

U.S. PATENT DOCUMENTS

| | | | |
|---|---|---|---|
| 3,849,684 A | 11/1974 | Duncan et al. | 310/242 |
| 3,983,432 A | 9/1976 | Rankin | 310/242 |
| 4,163,167 A | 7/1979 | Zelt et al. | 310/242 |
| 4,551,646 A | 11/1985 | Brown | 310/242 |
| 4,559,465 A | 12/1985 | Gagneux | 310/242 |
| 4,600,850 A | 7/1986 | Mazzorana et al. | 310/242 |
| 4,638,204 A * | 1/1987 | Kirchner et al. | 310/239 |
| 4,658,321 A * | 4/1987 | Lindner | 310/238 |
| 4,743,787 A | 5/1988 | Bunner et al. | 310/242 |
| 4,800,313 A | 1/1989 | Warner et al. | 310/242 |
| 5,019,741 A | 5/1991 | Fukui et al. | 310/239 |
| 5,103,131 A | 4/1992 | Sekine | 310/239 |
| 5,397,952 A | 3/1995 | Decker et al. | 310/242 |
| 5,532,536 A | 7/1996 | Gaspar | 310/239 |
| 5,644,182 A | 7/1997 | Rawls | 310/249 |
| 5,686,775 A * | 11/1997 | Veil et al. | 310/239 |
| 5,717,271 A | 2/1998 | Aoki et al. | 310/242 |
| 5,907,207 A | 5/1999 | Peot et al. | 310/245 |
| 6,031,313 A | 2/2000 | Sugai et al. | 310/239 |
| 6,380,656 B1 | 4/2002 | Harris et al. | 310/239 |
| 6,404,094 B1 * | 6/2002 | Drexlmaier et al. | 310/239 |
| 6,515,399 B1 * | 2/2003 | Lauf et al. | 310/239 |

FOREIGN PATENT DOCUMENTS

| | | | |
|---|---|---|---|
| DE | 3531309 A1 * | 3/1987 | H01R/39/39 |
| EP | 0651472 | 5/1995 | |
| EP | 0658961 | 6/1995 | |
| GB | 2018043 | 10/1979 | |
| JP | 62236342 | 10/1987 | |
| JP | 8214507 | 8/1996 | |

OTHER PUBLICATIONS

U.S. patent application Publication, No. US 2002/0047467 A1, Drexlmaier et al., Apr. 25, 2002.

Manelli Denison Selter PLLC, "Electric Motor Brush Holder Used to Suppress Audible and Electromagnetic Noise", Feb. 11, 2003 pp. 2–3.

* cited by examiner

*Primary Examiner*—Thomas M. Dougherty
*Assistant Examiner*—Yahveh Comas

(57) ABSTRACT

A brush holder 10 is provided for holding a hammer brush 12 of an electric motor. The brush holder includes a single piece of wire bent to define a brush-engaging portion 14 define an opening 15, and a torsion spring structure 16 connected to and spaced from the brush-engaging portion. The brush-engaging portion is constructed and arranged to prevent rotation of the hammer brush when coupled therewith.

14 Claims, 3 Drawing Sheets

ELECTRIC MOTOR BRUSH HOLDER FOR SUPPRESSING AUDIBLE AND ELECTROMAGNETIC NOISE

This application is based on U.S. Provisional Application No. 60/446,761, filed on Feb. 12, 2003, and claims the benefit thereof for priority purposes.

FIELD OF THE INVENTION

The invention relates to electric brush motors and more particularly, to brush holders for hammer-type brushes.

BACKGROUND OF THE INVENTION

In conventional electric brush motors provided with a hammer brush holder, an end of the carbon brush is inserted into a boxed-shaped receptacle of the hammer brush holder. The receptacle is configured and dimensioned to hold the carbon brush through a clamping action. However, with this structure, an inadequate clamping effect can occur when the applicable end of the carbon brush is introduced into the receptacle. Typical brush holders also do not adequately thermally and electrically isolate the brush or suppress electromagnetic radiation.

Accordingly, there is a need for an improved brush holder for a hammer brush that mechanically clamps the brush, thermally and acoustically isolates the brush, applies a current path to the brush, and suppresses electromagnetic radiation.

SUMMARY OF THE INVENTION

An object of the present invention is to fulfill the need referred to above. In accordance with the principles of the present invention, this objective is obtained by a providing a brush holder for holding a hammer brush of an electric motor. The brush holder includes a single piece of wire bent to define a brush-engaging portion having an opening, and a torsion spring structure connected to and spaced from the brush-engaging portion. The brush-engaging portion is constructed and arranged to prevent rotation of the hammer brush when disposed in the opening.

In accordance with another aspect of the invention, a method is provided for holding a hammer brush of an electric motor. The method provides a brush holder comprising a single piece of wire bent to define a brush-engaging portion defining an opening, and a torsion spring structure connected to and spaced from the brush engaging portion. The brush-engaging portion is constructed and arranged to prevent rotation of the hammer brush when associated therewith. A generally cylindrical member is provided for locating the brush. The torsion spring structure is placed over the cylindrical member and the hammer brush, having non-machined sides, is inserted into the opening so that the brush-engaging portion contacts the sides of the brush.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF THE EXEMPLARY EMBODIMENT

Figure 1:
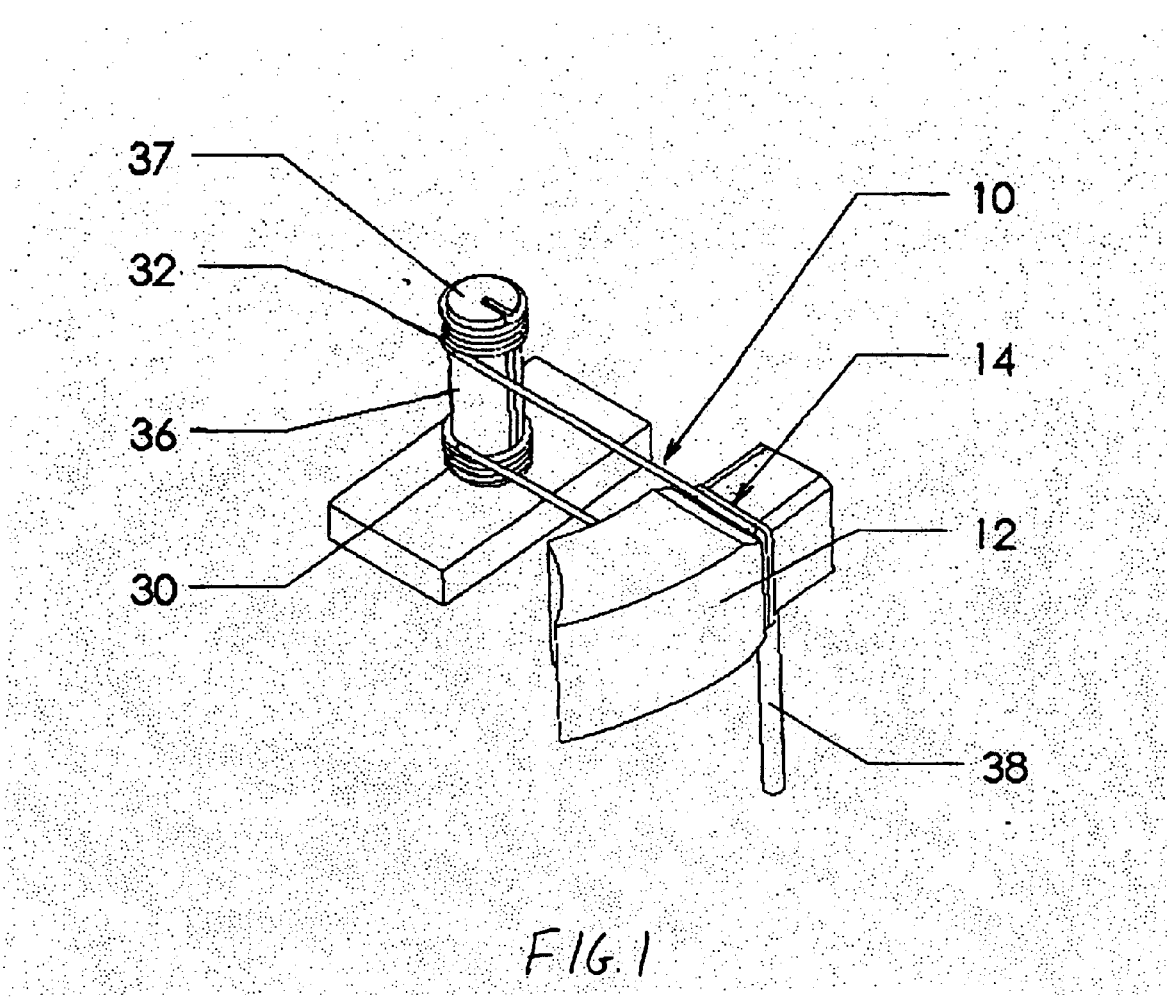
FIG. 1 is an enlarged perspective view of an electric motor brush holder, provided in accordance with the principles of the invention, shown coupled with a cylindrical member and to a motor brush.
Figure 2:
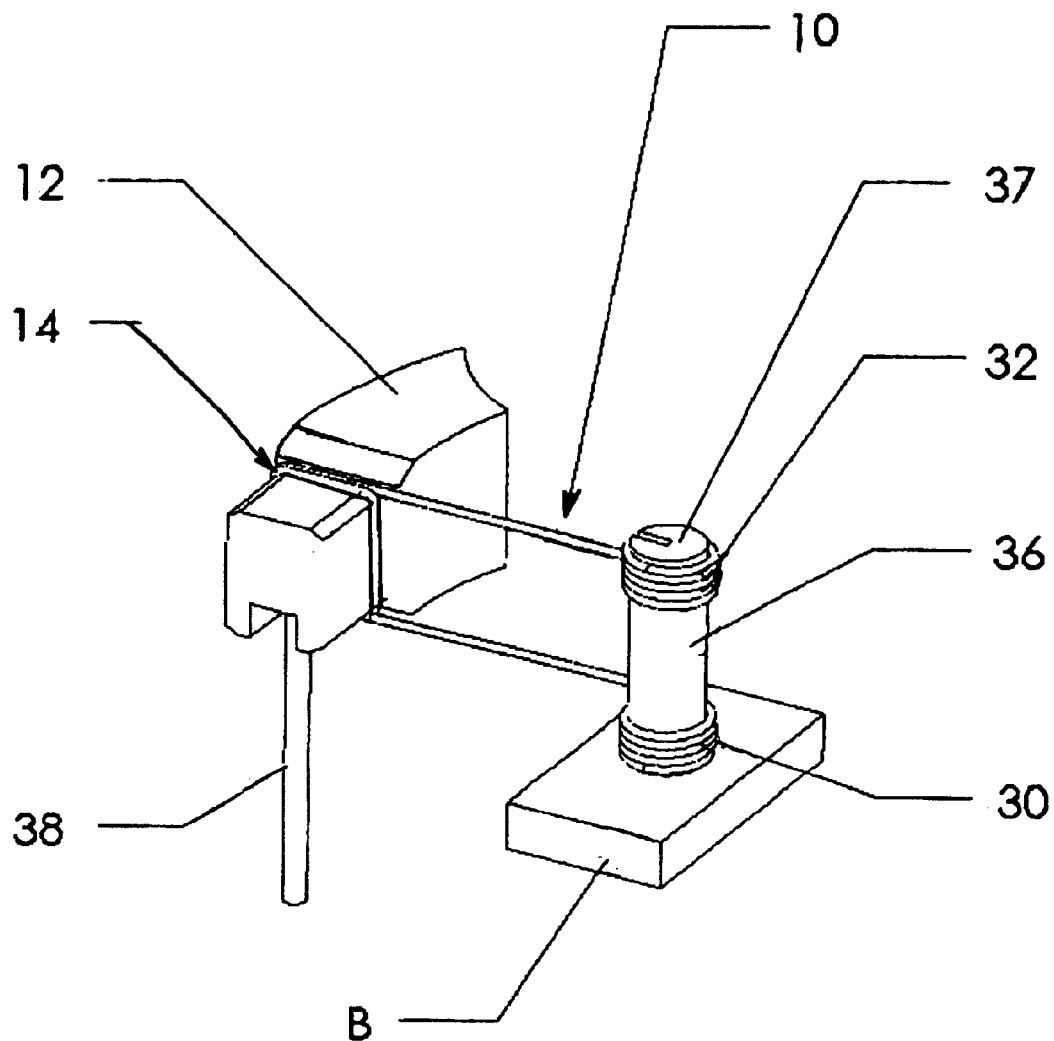
FIG. 2 is a rear view of FIG. 1.

With reference to FIG. 1, shown generally indicated at 10, is a brush holder for an electric motor, provided in accordance with the principles of the present invention. The brush holder 10 is generally a conductive spring that is constructed and arranged to mechanically clamp the motor brush 12, thermally and acoustically isolate the motor brush 12, provide the current path to the brush 12, apply brush pressure similar to a torsion spring to a commutator of the motor and, when used with a ferrite core, to act as an inductor to suppress electromagnetic radiation.

Figure 3:
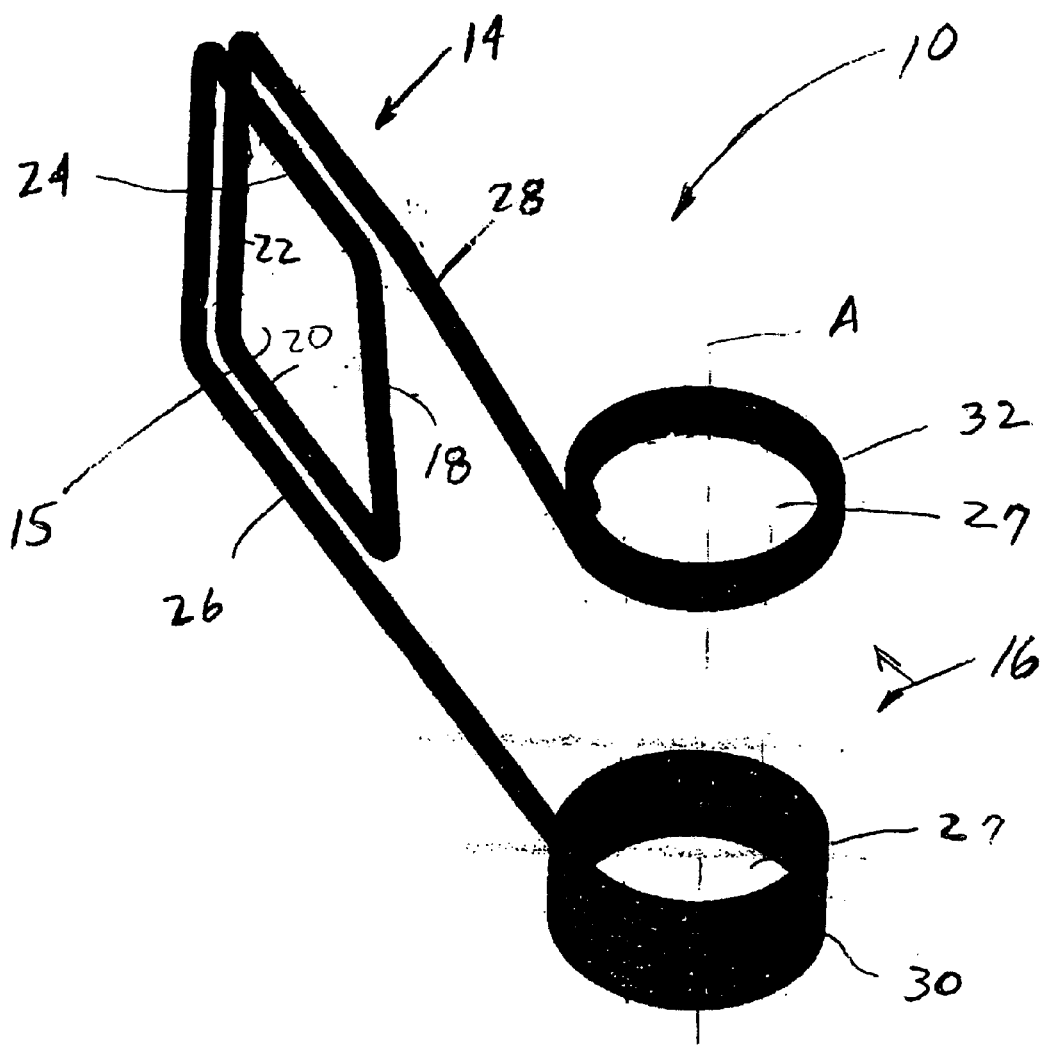
FIG. 3 is an enlarged perspective view of the electric motor bush holder of the invention.

With reference to FIG. 3, the brush holder 10 is composed of a single piece of wire and bent to define a brush-engaging portion, generally indicated at 14, defining an opening 15 for receiving a brush 12 (FIG. 1). The wire also defines a torsion spring structure, generally indicated at 16, coupled to and spaced from the brush-engaging portion 14. The brush-engaging portion 14 is preferably generally square to contact each side of a hammer brush 12 and thus prevent rotation of the boxed-shaped brush 12 when disposed in the opening 15. The brush 12 is has a generally square cross-section and advantageously has non-machined or unground sides since tight tolerances are not required to hold the brush 12 with the brush holder of the invention (there are no brush tubes). The brush is can be of the type described in U.S. Pat. Nos. 5,753,994 and 5,686,775, the contents of which are hereby incorporated into the specification by reference.

The brush engaging portion 14 includes a box-like structure having first opposing members 18 and 22 joined to second opposing members 20 and 24 to define the opening 15. First and second arms 26 and 28, respectively, join the brush-engaging portion 14 with the spring structure 16. The spring structure 16 includes a first coil member 30 coupled to arm 26, and a second coil member 32 coupled to arm 28. Thus, the multiple arms 26 and 28 ensure mechanical stability while limiting the transmissibility of vibration and heat. The first and second coil members are each disposed about a common axis A and each coil member has and opening 27 configured to receive a cylindrical member 36, the function of which will be appreciated below. The first and second coil members 30, 32 are in spaced relation with respect to the common axis A.

This brush holder 10 applies to all electric brush motors. The first and second coil members 30 and 32 are first placed over the cylindrical member 36 so that the cylindrical member 36 is received in openings 27 of the coil members. The second coil member 32 is thus disposed near free end 37 of the cylindrical member 36. When the second or top coil member 32 is lifted from end 37, the opening 15 of the brush engaging portion 14 increases in size permitting the installation of the brush 12. The top coil member 32 is then pushed down onto the cylindrical member 36, reducing the size of the opening 15 and thus, clamping the brush 12 and to maintain a good interference creating an electrical path to the brush 12The current path starts at arrow B in FIG. 1 and travels to the brush 12. Thus, the spring structure locates the brush with the brush engaging portion 14 being supported by a double-cantilever structure (arms 26 and 28).

When the spring structure 16 is composed of electrically conductive wire and is placed over a ferrite core defining the cylindrical member 36, the spring structure 16 acts an inductor for electromagnetic radiation suppression. The bush holder 10 provides brush pressure similar to a torsion spring to a commutator (not shown) and provides a current path for the brush 12 and inductor.

The brush holder 10 can be used in two ways. The first way is as a dampening mechanical brush holder. This configuration includes the brush holder 14, a plastic or metal post (defining the cylindrical member 36) to hold the spring structure 16 and a brush 12 with a shunt 38 for carrying the current. The second option is to place the ferrite core 36 in the center of the spring structure 16 and use a conductive spring structure material to make the spring structure 16 the conductive path. The configuration of the brush holder 10 permits the use of un-ground brushes and permits automation of the brush card assembly.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A brush holder for holding a hammer brush of an electric motor, the brush holder comprising a single piece of wire bent to define a brush engaging portion having an opening, and a torsion spring structure connected to and spaced from the brush engaging portion, the brush engaging portion being constructed and arranged to prevent rotation of the hammer brush when disposed in the opening.

2. The brush holder of claim 1, wherein the torsion spring structure is constructed and arranged to be moved between a first position, causing the opening to increase in size so as to permit insertion of the brush therein, and a second position, causing the opening to decrease from the increased size to permit the brush engaging portion to clamp against the brush.

3. The brush holder of claim 1, wherein the torsion spring structure includes a first coil member coupled to a first arm, and a second coil member coupled to a second arm, the first and second arms defining a pair of cantilevers coupled to the brush engaging portion.

4. The brush holder of claim 3, wherein the first and second coil members are disposed about a common axis and each coil member has an opening configured to receive a cylindrical member, the first and second coil members being in spaced relation with respect to the common axis.

5. The brush holder of claim 4, in combination with the cylindrical member received in the openings of the first and second coil members.

6. The brush holder of claim 5, wherein the wire is electrically conductive and the cylindrical member includes ferrite material.

7. The brush holder of claim 5, wherein the cylindrical member is plastic.

8. The brush holder of claim 1, wherein the brush engaging portion is of generally of square configuration constructed and arranged to contact each side of a hammer brush.

9. The brush holder of claim 8, in combination with a hammer brush, the hammer brush having a generally square cross-section and having non-machined sides, the brush being received in the opening so that the brush engaging portion contacts the sides of the brush.

10. A method of holding a hammer brush of an electric motor, the method including the steps of:

providing a brush holder comprising a single piece of wire bent to define a brush-engaging portion defining an opening, and a torsion spring structure connected to and spaced from the brush-engaging portion, the brush-engaging portion being constructed and arranged to prevent rotation of the hammer brush when associated therewith, providing a generally cylindrical member for locating the brush, placing the torsion spring structure over the cylindrical member, and inserting the hammer, brush, having non-machined sides, into the opening so that the brush-engaging portion contacts the sides of the brush.

11. The method of claim 10, wherein the wire is electrically conductive and the step of providing a cylindrical member provides the cylindrical member of ferrite material, with the torsion spring structure and cylindrical member defining an inductor.

12. The method of claim 10, wherein the step of providing a cylindrical member provides the cylindrical member of plastic material.

13. The method of claim 10, wherein the torsion spring structure includes a first coil member coupled to a first arm, and a second coil member coupled to a second arm, the first and second arms being coupled to the brush-engaging portion.

14. The method of claim 13, wherein the first and second coil members are disposed about a common axis and each coil member has an opening configured to receive the cylindrical member, the first and second coil members being in spaced relation with respect to the common axis.

* * * * *